United States Patent
Chou et al.

(10) Patent No.: US 7,097,339 B2
(45) Date of Patent: Aug. 29, 2006

(54) LIGHT SOURCE OF BACK LIGHT MODULE

(75) Inventors: Shen-Hong Chou, Kaohsiung (TW); Shu-Hsien Li, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 180 days.

(21) Appl. No.: 10/709,057

(22) Filed: Apr. 9, 2004

(65) Prior Publication Data
US 2004/0213017 A1 Oct. 28, 2004

(30) Foreign Application Priority Data
Apr. 22, 2003 (TW) .............................. 92109306 A

(51) Int. Cl.
*F21V 7/04* (2006.01)
(52) U.S. Cl. .................. 362/612; 362/561; 362/609
(58) Field of Classification Search ............... 362/612, 362/611, 561, 628, 609, 600
See application file for complete search history.

(56) References Cited
U.S. PATENT DOCUMENTS
6,330,111 B1 * 12/2001 Myers ...................... 359/599

6,404,131 B1 * 6/2002 Kawano et al. ............... 315/82
6,741,779 B1 * 5/2004 Veligdan ...................... 385/120
2004/0175562 A1 * 9/2004 Hayashi et al. ............. 428/330

* cited by examiner

*Primary Examiner*—Renee Luebke
*Assistant Examiner*—Julie A. Shallenberger
(74) *Attorney, Agent, or Firm*—Jianq Chyun IP Office

(57) ABSTRACT

A light source inside a back light module comprising a red light-emitting diode, a green light-emitting diode, a blue light-emitting diode, a diffusion device, some supporting elements and reflectors is provided. The red, green and blue light-emitting diodes mount on a holder. The diffusion device is set up over the holder. The diffusion device comprises a transparent body and a plurality of fine particles distributed within the transparent body. The supporting elements are positioned between the diffusion device and the holder. The reflectors are attached to the surface on each side of the holder and the diffusion device. Red, green and blue lights from various light-emitting diodes are thoroughly mixed inside the diffusion device to form a uniform white light.

19 Claims, 4 Drawing Sheets

LIGHT SOURCE OF BACK LIGHT MODULE

CROSS REFERENCE TO RELATED APPLICATIONS

This application claims the priority benefit of Taiwan application Ser. No. 92109306, filed Apr. 22, 2003.

BACKGROUND OF INVENTION

1. Field of the Invention

The present invention generally relates to a light source of a back light module for illuminating a liquid crystal display, and more particularly, the present invention relates to a light source that produces a white light through mixing red, green and blue lights.

2. Description of the Related Art

To match the modern life style, video or imaging device needs to be lighter and slimmer. Although the conventional cathode ray tube (CRT) display has many advantages, the design of the electron gun renders it heavy and bulky. Moreover, there is always some risk of radiation emitted by the conventional cathode ray tube hurting viewer"s eyes. With big leaps in the techniques in manufacturing semiconductor devices and electro-optical devices, flat panel displays such as liquid crystal displays (LCD), organic light-emitting displays (OLED) and plasma display panel (PDP) have gradually become mainstream display products.

According to the light source, a liquid crystal display can be classified as belonging to one of the three types, namely, a reflection LCD, a transmissive LCD and a transflective LCD. Using a transmission or a transflective LCD as an example, the LCD mainly comprises a liquid crystal panel and a back light module. The back light module provides a plane light source to illuminate the liquid crystal panel for displaying images.

The light source of a conventional back light module is either a fluorescent lamp or a set of light-emitting diodes. If light-emitting diodes are used as the light source in a back light module, white light is produced through a mixing of the red (R), green (G) and blue (B) lights emitted from various diodes. In the conventional technique, red, green and blue light-emitting diodes are laid flat on a surface so that the red, green and blue lights from various light-emitting diodes can mix together to form a plane light source that emits white light.

However, due to the limitation caused by the light dispersion angle of a light-emitting diode, red, green and blue lights from the light-emitting diodes are mixed into white light at a distance of more than a few centimeters above the original sources. This constrains the size of a back light module design. Another problem that results from mixing red, green and blue lights to produce white light is that there is a significant difference in the measured spectrum distribution of white light according to the location. In other words, the spectrum of the white light produced through mixing of red, green and blue lights is highly non-uniform.

SUMMARY OF INVENTION

Accordingly, one object of the present invention is to provide a source of white light for a back light module by mixing red, green and blue lights from various light-emitting diodes so that a highly uniform source of plane white light is produced.

Another object of this invention is to provide a source of white light for a back light module by mixing red, green and blue lights from various light-emitting diodes in such a way that the white light is no longer subjected to any dispersion angle limitation. Hence, some size restrictions of the back light module are lifted.

To achieve these and other advantages and in accordance with the purpose of the invention, as embodied and broadly described herein, the invention provides a first type of light source for a back light module. The back light module comprises a plurality of light-emitting diodes (LEDs), a diffusion device, a plurality of supporting elements and reflectors. The LEDs are mounted on a holder. The light-emitting diodes (LEDs) include at least a red light-emitting diode, a green light-emitting diode and a blue light-emitting diode. The diffusion device is positioned above the LEDs. The diffusion device comprises a transparent body with a plurality of fine particles dispersed throughout its interior. The transparent body is a highly transparent planar substrate and the fine particles within the transparent body have different refractivity rates, for example. The supporting elements are set between the diffusion device and the holder. Supporting elements having good reflective property may be chosen so that the supporting elements may also serve as light guides. The reflectors are positioned on each side of the diffusion device and the holder.

This invention also provides an alternative type of light source for a back light module. The back light module comprises at least a first light-emitting diode, at least a second light-emitting diode, at least a third light-emitting diode, a diffusion device, and reflectors. The first light-emitting diode has a first optical axis, the second light-emitting diode has a second optical axis and the third light-emitting diode has a third optical axis. The first optical axis, the second optical axis and the third optical axis are not parallel to each other. Furthermore, the first light-emitting diode is selected from at least a red light-emitting diode, at least a green light-emitting diode, at least a blue light-emitting diode or a combination of them. The second light-emitting diode is selected from at least a red light-emitting diode, at least a green light-emitting diode, at least a blue light-emitting diode or a combination of them. The third light-emitting diode is selected from at least a red light-emitting diode, at least a green light-emitting diode, at least a blue light-emitting diode or a combination of them. The diffusion device is set above the first light-emitting diode, the second light-emitting diode and the third light-emitting diode. Furthermore, the first optical axis, the second optical axis and the third optical axis direct towards a same location on the diffusion device. In addition, the diffusion device comprises a transparent body and a plurality of fine particles distributed within the transparent body. The transparent body is a transparent acrylic body and the fine particles inside the transparent body have different refractivity rates such as glass particles, for example. The reflectors are attached to a portion of the surface of the diffusion device such that the area on the diffusion device outside the set of reflectors constitutes a light incident surface and a light-emitting surface.

The aforementioned light source for the back light module furthermore comprises a first lens, a second lens and a third lens. The first lens is set between the first light-emitting diode and the diffusion device. The second lens is set between the second light-emitting diode and the diffusion device. The third lens is set between the third light-emitting diode and the diffusion device. Light from the first light-emitting diode, the second light-emitting diode and the third light-emitting diode passes through the first lens, the second lens and the third lens respectively before collimating into the diffusion device. Thus, through the lens, light from various light-emitting devices is more fully focused upon the diffusion device to increase overall incident light efficiency.

In this invention, red, green and blue light-emitting diodes are set over the diffusion device. The diffusion device contains fine particles of different refractive rates. Hence, when lights of three different colors (red, green, blue) impinge upon the fine particles inside the diffusion device, the lights will be refracted at various angles producing a scattered distribution. Ultimately, the lights of the three different colors (red, green and blue) are well mixed together inside the diffusion device to produce uniform a white light.

Furthermore, the light-emitting diodes producing lights of the three different colors (red, green and blue) may be positioned at different horizontal surfaces so that the optical axis of the three differently colored lights projects on a same location of the diffusion device. Since the distance required to scatter all three beams of lights is reduced, the three colors are more thoroughly mixed together inside the diffusion device.

This invention also disposes a spherical lens between the light-emitting diodes and the diffusion device for focusing photonic energy into the diffusion device so that the efficiency of the incident light beam is increased.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
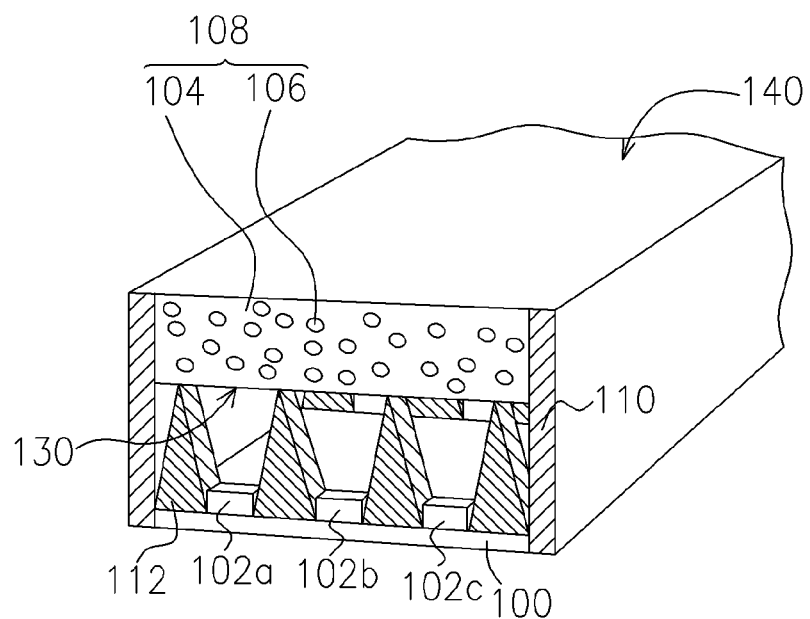
FIG. 1 is a diagram showing the structural layout of a light source inside a back light module according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram showing the structural layout of a light source inside a back light module according to a first preferred embodiment of this invention. The back light module according to this embodiment includes a plurality of light-emitting diodes 102a, 102b, 102c, a diffusion device 108, a plurality of supporting elements and reflectors 110.

The light-emitting diodes 102a, 102b, 102c is set over a holder 100 with light-reflecting property. The number and distribution of the light-emitting diodes 102a, 102b and 102c on the holder 100 depends on actual requirement. The light-emitting diodes 102a, 102b and 102c include, for example, a red (R) light-emitting diode, a green (G) light-emitting diode and a blue (B) light-emitting diode.

The diffusion device 108 is set over the holder 100. The diffusion device 108 comprises a transparent body 104 and a plurality of fine particles 106 are distributed within the transparent body 104. In this embodiment, the transparent body 104 is a highly transparent planar substrate made from acrylic material, for example. The fine particles 106 within the transparent body 104 have different refractivity rates, such as glass particles.

The supporting elements 112 are set between the diffusion device 108 and the holder 100 for supporting the diffusion device 108. Here, a light-reflecting material can be selected to fabricate the supporting elements 112 so that supporting elements 112 also serves as a light-guide for channeling the light energy from the light-emitting diodes 102a, 102b, 102c into the diffusion device 108 besides a support for the diffusion device.

Furthermore, the reflectors 110 are set on each side of the holder 100 and the diffusion device 108. The reflectors 110 increase the efficiency of incident light upon the diffusion device 108 to enhance the outgoing white light.

Lights produced by the light-emitting diodes 102a, 102b, 102c travel directly to the light incident surface 130 of the diffusion device 108 or indirectly through the supporting elements 112 and the reflectors 110. When the lights of the three primary colors red, green and blue, impinges upon the particles 106 of different refractivity rates within the transparent body 104, the colors are fully refracted and scattered to produce a white light. Finally, the white light emerges from a light-emitting surface 140 of the diffusion device 108.

Since the diffusion device 108 thoroughly mixes the three primary colors (red, green and blue) into white light, non-uniformity phenomenon of the white light as describe above can be effectively eliminated. Furthermore, with thorough mixing of the primary colors, the dispersion angle of the light-emitting diodes no longer constrains the design of the back light module dimensionally.

Figure 2:
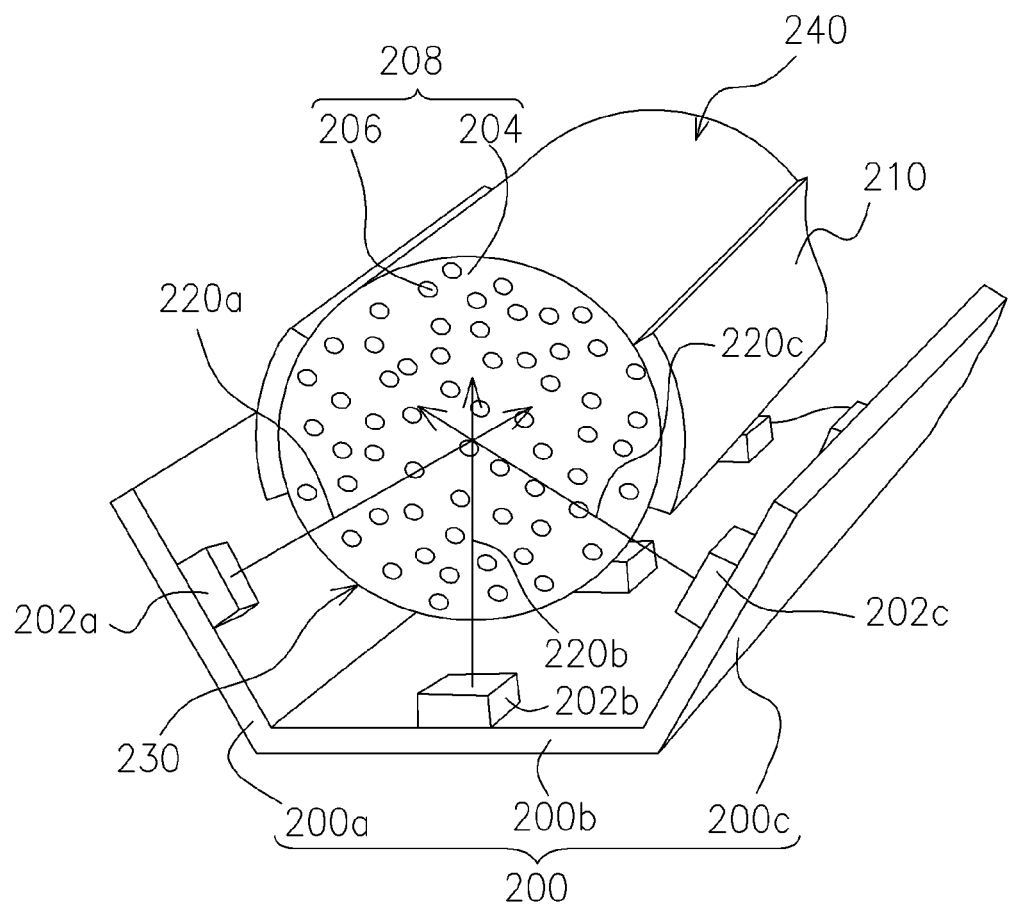
FIG. 2 is a diagram showing the structural layout of a light source inside a back light module according to a second preferred embodiment of this invention.

FIG. 2 is a diagram showing the structural layout of a light source inside a back light module according to a second preferred embodiment of this invention. The back light module according to the embodiment includes at least a first light-emitting diode 202a, at least a second light-emitting diode 202b, at least a third light-emitting diode 202c, a diffusion device 208, a plurality of supporting elements and reflectors 210.

The first light-emitting diode 202a has a first optical axis 220a, the second light-emitting diode 202b has a second optical axis 220b and the third light-emitting diode 202c has a third optical axis 220c. The first optical axis 220a, the second optical axis 220b and the third optical axis 220c are not parallel to each other but crosses over each other at a location. The number and distribution of the first light-emitting diode 202a, the second light-emitting diode 202b and the third light-emitting diode 202c depends on design requirement. In addition, the first light-emitting diode 202a, the second light-emitting diode 202b and the third light-emitting diode 202c are set on a holder 200, for example, with light-reflecting property. The holder 200 has three main sections including a first section 200a, a second section 200b and a third section 200c. The second section 200b and the first section 200a of the holder 200 form an obtuse angle and the section 200b and the third section 200c of the holder 200 form an obtuse angle. Therefore, the first light-emitting diode 202a on the first section 200a, the second light-emitting diode 202b on the second section 202b and the third light-emitting diode 202c on the third section are all on a different plane but all their optical axes converge to a single location.

The first light-emitting diode 202a on the first section 200a of the holder comprises at least a red light-emitting diode, at least a green light-emitting diode, at least a blue light-emitting diode or a combination of them, for example. The second light-emitting diode 202b on the second section 200b of the holder 200 comprises at least a red light-emitting diode, at least a green light-emitting diode, at least a blue light-emitting diode or a combination of them. Similarly, the third light-emitting diode 202c on the third section 200c of the holder 200 comprises at least a red light-emitting diode, at least a green light-emitting diode, at least a blue light-emitting diode or a combination of them.

The diffusion device 208 is set over the first light-emitting diode 202a, the second light-emitting diode 202b and the third light-emitting diode 202c. The first optical axis 220a, the second optical axis 220b and the third optical axis 220c all direct to a same location within the diffusion device 208. The diffusion device 208 comprises a transparent body 204 and a plurality of fine particles 206 distributed within the transparent body 204. In this embodiment, the transparent body 204 is a highly transparent planar substrate made from acrylic material, for example. The fine particles 206 within the transparent body 204 are powdery substances having different refractivity rates such as glass particles.

The reflectors 210 are attached on the surface of a portion of the diffusion device 208. A light-incident surface 230 and a light-emitting surface 240 are located on the exposed area of the diffusion device 208, that is, the region outside the reflectors 210.

When the beams of light from the first light-emitting diode 202a, the second light-emitting diode 202b and the third light-emitting diode 202c enter the light incident surface 230 of the diffusion device 208, the three beams (including red, green and blue) converge together at one location to produce a white light. Due to the presence of fine particles 206 within the diffusion device 208, all three primary colors are fully refracted. The white light produced by mixing lights of the three primary colors emerges from the light-emitting surface 240 of the diffusion device 208. In addition, reflectors 210 are attached to each side of the diffusion device 208. The reflectors 210 enhance the efficiency of the white light from the diffusion device 208.

Figure 3:
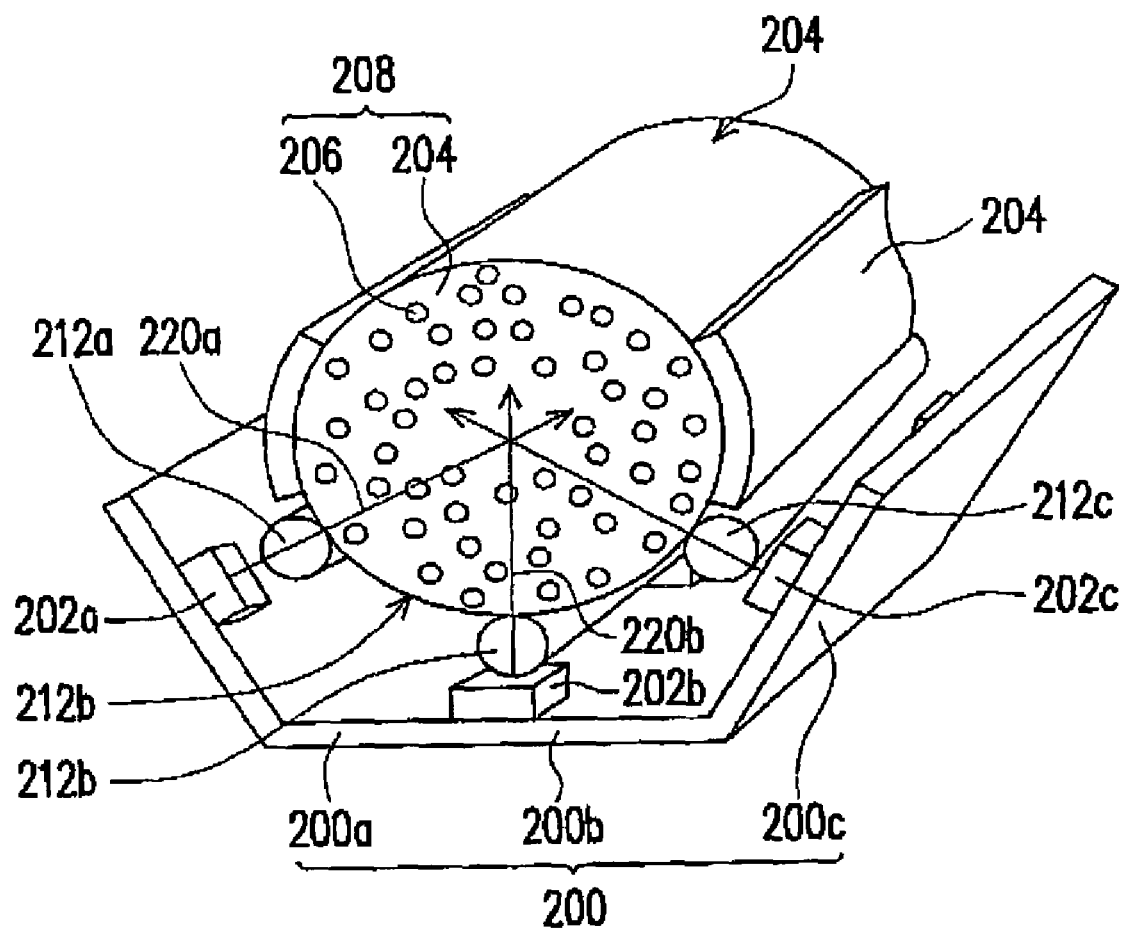
FIG. 3 is a diagram showing the structural layout of a light source inside a back light module according to a third preferred embodiment of this invention.

The aforementioned back light module may further include a plurality of lenses. FIG. 3 is a diagram showing the structural layout of a light source inside a back light module according to a third preferred embodiment of this invention. As shown in FIG. 3, the back light module further comprises a first lens 212a set between the first light-emitting diode 202a and the diffusion device 208, a second lens 212b set between the second light-emitting diode 202b and the diffusion device 208 and a third lens 212c set between the third light-emitting diode 202c and the diffusion device 208. Furthermore, the first lens 212a, the second lens 212b and the third lens 212c are cylindrical spherical lens, for example. The lights produced by the first light-emitting diode 202a, the second light-emitting diode 202b and the third light-emitting diode 202c pass through the first lens 212a, the second lens 212b and the third lens 212c before converging into the diffusion device 208. Through the lenses 212a, 212b and 212c, lights from the first light-emitting diode 202a, the second light-emitting diode 202b and the third light-emitting diode 202c are focused onto the interior of the diffusion device 208 so that the efficiency of light incident upon the diffusion device 208 is increased.

Figure 4:
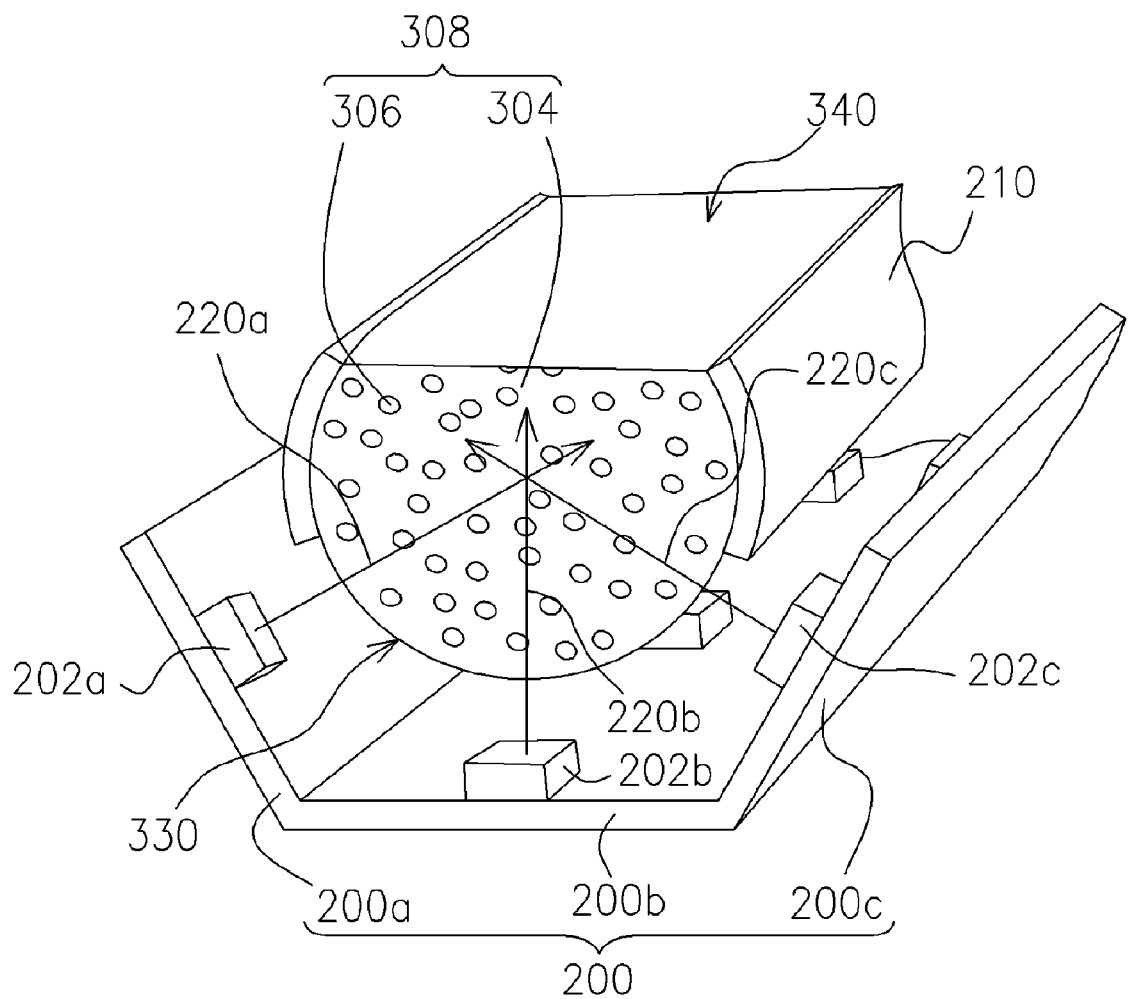
FIG. 4 is a diagram showing the structural layout of a light source inside a back light module according to a fourth preferred embodiment of this invention.
Figure 5:
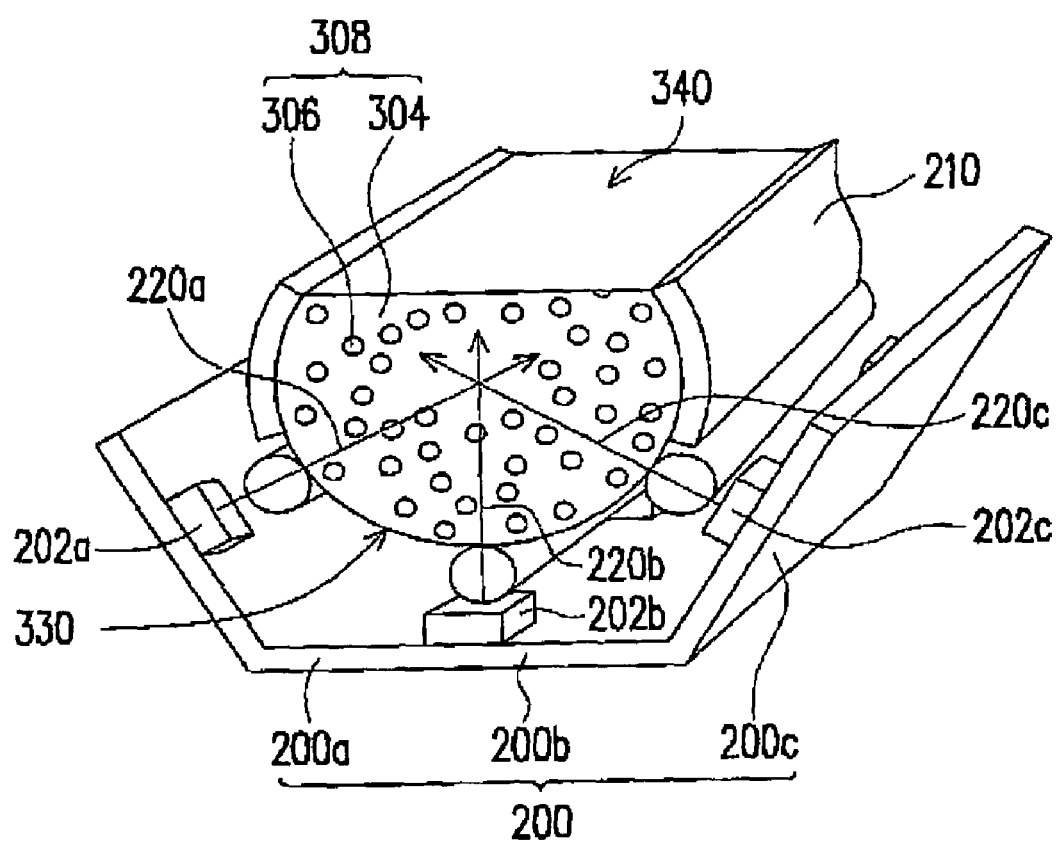
FIG. 5 is a diagram showing the structural layout of a light source inside a back light module according to a fifth preferred embodiment of this invention.

In addition, the light-emitting surface of the diffusion device as shown in FIGS. 2 and 3 may be flattened to form a structure as shown in FIGS. 4 and 5. FIGS. 4 and 5 are diagrams showing the structural layout of a light source inside a back light module according to a fourth and a fifth preferred embodiment of this invention. As shown in FIGS. 4 and 5, the diffusion device 308 comprises a transparent body 304 and a plurality of fine particles 306 distributed within the transparent body 304. The reflectors 210 are attached to the surface on each side of the diffusion device 308. The exposed area on the diffusion device 308 outside the reflectors 210 constitutes a light incident surface 330 and a light-emitting surface 340. Here, the light incident surface 330 is curved but the light-emitting surface 340 is planar. With a fiaLtened light-emitting surface 340, the white light emerging from the diffusion device 308 has a more uniform intensity.

In this invention, red, green and blue light-emitting diodes are set over the diffusion device. The diffusion device contains fine particles of different refractive index. Hence, when the lights of three different colors (red, green, blue) impinges upon the fine particles inside the diffusion device, the lights will be refracted at various angles producing a scattered distribution. Ultimately, the lights of the three different colors (red, green and blue) are well mixed together inside the diffusion device to produce a uniform white light.

Furthermore, the light-emitting diodes producing the lights of the three different colors (red, green and blue) may be positioned at different horizontal surfaces so that the optical axis of the three differently colored lights projects on a same location of the diffusion device. Since the distance required to scatter all three beams of lights is reduced, the three colors are more thoroughly mixed together inside the diffusion device.

In addition, spherical lenses can be set between the light-emitting diodes and the diffusion device for focusing photonic energy into the diffusion device so that the incident light beam has a higher efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A light source inside a back light module, comprising:
a plurality of light-emitting diodes mounted on a holder;
a diffusion device set up over the holder, wherein the diffusion device comprises a transparent body and a plurality of fine particles distributed within the transparent body;
a plurality of supporting elements set up between the diffusion device and the holder; and
reflectors positioned on each side of the holder and the diffusion device.

2. The light source of claim 1 wherein the supporting elements have a light-reflecting property.

3. The light source of claim 1, wherein the fine particles within the diffusion device have different refractivity rates.

4. The light source of claim 1, wherein the fine particles within the diffusion device comprise glass particles.

5. The light source of claim 1, wherein the transparent body of the diffusion device comprises a transparent planar substrate.

6. The light source of claim 1, wherein the holder has a light-reflecting property.

7. The light source of claim 1, wherein the light-emitting diodes comprise at least a red light-emitting diode, at least a green light-emitting diode and at least a blue light-emitting diode.

8. A light source inside a back light module, comprising:
- at least a first light-emitting diode having a first optical axis;
- at least a second light-emitting diode having a second optical axis;
- at least a third light-emitting diode having a third optical axis, wherein the first optical axis, the second optical axis and the third optical axis are not parallel to one another;
- a diffusion device set up over the first light-emitting diode, the second light-emitting diode and the third light-emitting diode such that the first optical axis, the second optical axis and the third optical axis all converge towards the diffusion device; and
- reflectors attached to the surface of the diffusion device such that uncovered portion of the diffusion device constitute a light-incident surface and a light-emitting surface.

9. The light source of claim 8, wherein the first optical axis, the second optical axis and the third optical axis all direct towards a same location within the diffusion device.

10. The light source of claim 8, wherein the first light-emitting diode, the second light-emitting diode and the third light-emitting diode are all mounted on a holder.

11. The light source of claim 8, wherein the light source further comprises a first lens, a second lens and a third lens such that the first lens is positioned between the first light-emitting diode and the diffusion device, the second lens is positioned between the second light-emitting diode and the diffusion device and the third lens is positioned between the third light-emitting diode and the diffusion device.

12. The light source of claim 11, wherein the first lens, the second lens and the third lens comprise cylindrical spherical lenses.

13. The light source of claim 8, wherein diffusion device furthermore comprises:
- a transparent body; and
- a plurality of fine particles distributed within the transparent body.

14. The light source of claim 13, wherein the fine particles have different refractivity rates.

15. The light source of claim 13, wherein the fine particles within the diffusion device comprise glass particles.

16. The light source of claim 13, wherein material constituting the transparent body of the diffusion device comprises transparent acrylic material.

17. The light source of claim 8, wherein the first light-emitting diode is selected from a group consisting of at least a red light-emitting diode, at least a green light-emitting diode, at least a blue light-emitting diode and an assembly of them.

18. The Tight source of claim 8, wherein the second light-emitting diode is selected from a group consisting of at least a red light-emitting diode, at least a green light-emitting diode, at least a blue light-emitting diode and an assembly of them.

19. The light source of claim 8, wherein the third light-emitting diode is selected from a group consisting of at least a red light-emitting diode, at least a green light-emitting diode, at least a blue light-emitting diode and an assembly of them.

* * * * *